US008769097B2

(12) United States Patent
Rizk

(10) Patent No.: US 8,769,097 B2
(45) Date of Patent: Jul. 1, 2014

(54) FIRST-POINT OF ENTRY (FPOE) METHOD FOR MULTIPLE SOCIAL NETWORKS AND SYSTEMS AND METHODS FOR ENABLING USERS TO INTERACT DEMOCRATICALLY WITHIN OPEN GROUPS AND FOR MANAGING VOTING RIGHTS IN AN ONLINE SOCIAL NETWORK ENVIRONMENT

(76) Inventor: Henri Rizk, Jersey City, NJ (US)

( * ) Notice: Subject to any disclaimer, the term of this patent is extended or adjusted under 35 U.S.C. 154(b) by 37 days.

(21) Appl. No.: 13/341,429

(22) Filed: Dec. 30, 2011

(65) Prior Publication Data

US 2012/0166255 A1    Jun. 28, 2012

Related U.S. Application Data

(63) Continuation-in-part of application No. 13/079,153, filed on Apr. 4, 2011.

(60) Provisional application No. 61/325,635, filed on Apr. 19, 2010.

(51) Int. Cl.
*H04L 12/46* (2006.01)
*G06F 15/173* (2006.01)

(52) U.S. Cl.
USPC ............. 709/225; 709/223; 705/12; 235/386

(58) Field of Classification Search
CPC ..................................................... G06Q 30/02
USPC .......................... 705/7, 12; 709/223; 235/386
See application file for complete search history.

(56) References Cited

U.S. PATENT DOCUMENTS

| 5,878,399 | A | 3/1999 | Peralto |
|---|---|---|---|
| 6,873,966 | B2 | 3/2005 | Babbitt et al. |
| 7,055,742 | B2 | 6/2006 | Sinha |
| 7,237,717 | B1 | 7/2007 | Rao et al. |
| 7,306,148 | B1 | 12/2007 | Morganstein |
| 7,451,221 | B2 | 11/2008 | Basani et al. |
| 7,464,148 | B1 | 12/2008 | Filho et al. |
| 8,311,948 | B1 * | 11/2012 | Lu .................................. 705/319 |
| 2005/0185647 | A1 * | 8/2005 | Rao et al. ...................... 370/392 |
| 2007/0067322 | A1 * | 3/2007 | Harrison, Jr. ................. 707/100 |
| 2009/0083104 | A1 * | 3/2009 | Barrett .............................. 705/7 |
| 2009/0144392 | A1 * | 6/2009 | Wang et al. ................... 709/217 |
| 2011/0107382 | A1 * | 5/2011 | Morris et al. ................. 725/109 |

(Continued)

OTHER PUBLICATIONS

IBM, System and Method to directly connect to a person in a social network based on interested and existing connections, Dec. 30, 2008, ip.com.*

*Primary Examiner* — Farid Homayounmehr
*Assistant Examiner* — Lizbeth Torres-Diaz

(57) ABSTRACT

A First-Point Of Entry (FPOE) method for multiple social networks and systems & methods for enabling users to interact democratically within open groups and for managing voting rights in an online social network environment. When a user joins a new social network the FPOE system and method downloads the user's contributed information from a prior social network. The user's profile, connections and privileges from the prior social network are carried over to the new social network. Similarly, when a user updates his/her information, the new information automatically flows through the various social networks on the FPOE. Another aspect of the invention enables users to interact democratically and manage voting rights. A multilevel test is administered to new users to calculate valid points and various voting privileges are assigned accordingly.

9 Claims, 22 Drawing Sheets

(56) References Cited

U.S. PATENT DOCUMENTS

| | | | |
|---|---|---|---|
| 2011/0138171 A1* | 6/2011 | Yildiz | 713/153 |
| 2012/0166255 A1* | 6/2012 | Rizk | 705/12 |
| 2012/0209998 A1* | 8/2012 | Svarfvar et al. | 709/225 |
| 2013/0024946 A1* | 1/2013 | Doshi et al. | 726/28 |
| 2013/0091204 A1* | 4/2013 | Loh et al. | 709/204 |

* cited by examiner

Figure 9:

| Member's name | Date join | Desired membership | Final membership | Elector | Group profile |
|---|---|---|---|---|---|
| David Davis | 2011-09-08 | President | Member | | |
| Evelyn Davis | 2011-09-08 | Member | Member | Yes | |
| Judith Davis | 2011-09-08 | Member | Member | Yes | |
| Max Davis | 2011-09-08 | Member | Member | Yes | |
| Clara Doe | 2011-09-08 | Member | Member | Yes | |
| Janet Doe | 2011-09-08 | Officer | Member | Yes | |
| John Doe | 2011-09-08 | President | President | Yes | |
| Mike Doe | 2011-09-08 | Member | Member | Yes | |
| Cathy Smith | 2011-09-11 | Member | Member | Yes | |
| Mike Smith | 2011-09-11 | Member | Member | No | |
| Paul Smith | 2011-09-11 | Member | Member | No | |
| Terry Smith | 2011-09-11 | Member | Member | No | |
| Jack Walker | 2011-09-08 | Officer | Appointed officer | Yes | |

GROUP'S GENERAL LEDGER

| Transaction date | Payment date | Transaction code | Transaction description | Account name | Transaction type | Quantity | Total |
|---|---|---|---|---|---|---|---|
| 09/04/2011 | 09/08/2011 | 52711 | Legal fees | Lawyers & Co | Debit | | $530.00 |
| 09/05/2011 | 09/08/2011 | 54516 | Advertising (Online xyz.com) | Madison Avenue Inc. | Debit | | $150.00 |
| 09/10/2011 | 09/10/2011 | 41105 | Membership fees | John Doe | Credit | 1 | $100.00 |
| 09/11/2011 | 09/11/2011 | 55809 | Transportation: Gas | ABC Gas Station | Debit | 18 Gals | $52.45 |

2204  2206  2208  2210  2212  2214  2216  2218

(2220, 2222, 2224)

FIRST-POINT OF ENTRY (FPOE) METHOD FOR MULTIPLE SOCIAL NETWORKS AND SYSTEMS AND METHODS FOR ENABLING USERS TO INTERACT DEMOCRATICALLY WITHIN OPEN GROUPS AND FOR MANAGING VOTING RIGHTS IN AN ONLINE SOCIAL NETWORK ENVIRONMENT

CROSS-REFERENCE TO RELATED APPLICATIONS

This Application is a Continuation-In-Part of co-pending U.S. patent application Ser. No. 13/079,153 filed on Apr. 4, 2011, which claims priority from U.S. Provisional Application Ser. No. 61/325,635 filed on Apr. 19, 2010. The entire contents of the two prior applications are incorporated herein by reference thereto.

BACKGROUND OF THE INVENTION

1. Field of the Invention

This invention offers a First-Point of Entry (FPOE) method for users wanting to join multiple social networking websites and for users who are members of several subscribing social networks. The system offers modular and seamless cross-websites networking capabilities for internet users who need to enter and/or update their profile information (personal and professional data) only once at the first point of entry without the need for duplicate and repetitive inputs.

This invention also relates to a system and method for enabling users to interact democratically within open groups in a social network environment and managing voting rights in groups where anyone with an internet connection could join the group.

2. The Prior Art

Definitions

In a social network, a group consists of a collection of individuals sharing common interests, relationships or links. A group can consist of the members of a sports club, or a political organization, classmates, a neighborhood association, a fan club, and so on. There can be as many groups and group types as people can find ways to link and connect through various types of commonalities. In terms of size, a group can consist of only two people or can aggregate several thousands of people.

Closed groups are groups where every membership request to a group has to be individually approved by the group representatives, owners or officers. Open groups are groups where anyone can join the group without any prior approval required.

Open groups really came to age with the internet and the advent of the computer. Before the computer, membership requests received either by mail, phone or in person had to be manually handled by a representative of the group. With the advent of computers, membership requests could be handled automatically by software and could received digitally through an internet connection instead of through physical means.

Web-Based Social Networking & Groups

In the age of the internet, every group had to establish an internet presence in the form of a website. The group's website supplemented or replaced the old newsletters which kept the members informed about what was happening in the group.

Depending on the group technical expertise, groups took different routes.

Some groups lacking a strong technical expertise created simple and rudimentary informational websites where members could only obtain information about the group. Other groups with more technical expertise added some social networking capabilities. Depending on the group's resources, the social networking capabilities were of various levels of sophistication. Some offered a traditional central directory of their members which might be updated at various intervals. Other offered an interactive profile management solution where members could themselves update their profile information when their personal or professional situation changed. For members who experienced frequent changes in their personal or professional situations, this solution enabled them to keep other members informed about their life changes. Other groups offered solutions where the members could interact directly with each other through their website. Often such solutions where customized for the group and the members of the group could not transfer their existing profile to the other groups they belonged to, resulting in much duplication of efforts.

In other cases, some groups completely outsourced their membership management functions to major social networking providers such as Facebook or Linkedin. However in this later case, a member had to leave the group's own website and could only interact with other members of the group through the provider's own website. This setup could be unsatisfactory as it didn't provide the users with an integrated and seamless environment from the group's website to the provider's website.

Another variant is to ask new members for their login information on a major social network provider and transfer the member's profile information from the provider's site. But this variant is also unsatisfactory as it requires the user to agree to share his/her login information, which he/she might be reluctant to do as this would give access not only to his/her profile information but also to his/her activity information such as emails and posts.

Evolution of Groups

In the past, prior to the internet, most groups where geographically based. When previous forms of communications were slow, it was not practical to manage disseminated groups geographically. When a group wanted to expand its territory, it would open a local representation to manage its members in a particular geographical area, and it would do so only if a critical mass could be achieved to cover the expenses. Thus managing dispersed groups was either slow or expensive.

Prior to the internet, it was not impossible but certainly difficult and expensive to have many identities. You needed to maintain either different physical addresses and/or phone numbers which could not be easily obtained. With the computer and the internet, it became possible to easily create literally thousands of online identities at the click of a mouse. Certainly, this ease in creating many identities creates a challenge for open groups which want to provide to their users a democratic environment.

Election in Open Groups

The internet revolutionized the way groups were formed. With the internet it became possible to form groups across borders and oceans at the click of the mouse. Also it was possible for some individuals to multiple identities with an ease that was not previously possible. With robots, one individual could easily manage hundreds of identities. In such an environment managing democratic groups was problematic because the election of the group officers or any vote within the group could be easily influenced by cheating members. The old danger of ballot stuffing was too real in the age of the internet for open groups. For open groups, the risk of fraud is all too real and must be mitigated by adding additional safeguards.

Because of such considerations, managing larger groups on the internet has been unsatisfactory from a governance standpoint and most internet solutions to group management have not allowed users to adopt democratic governance structures and lack the basic democratic features that we take for granted in our democratic society. In practically all open groups, there are no elections of the group officers and representatives and when the group owner wants to step down or leave the group, the transmission of the executive powers within the group is decided behind closed doors without input of the majority of the group members.

Elections are a fundamental feature of democratic systems. Elections are the process by which voters and citizens decide important decisions regarding the governance of the group. Elections are used to decide who will represent the group and manage the group on a day to day basis. In a divided system of government, there are at least three recognized centers/branches of powers: the legislative, the executive and the judiciary. In our society, almost all branches of the government are elected by voters. In some cases (such as in referendums) or in direct democracies such as in some Swiss Cantons, voters can also vote directly on important questions submitted to them. The general rule is that voting should be anonymous, but in some cases voting can be done by show of hands when the size of the electorate is still manageable. In public affairs the principle of one man one vote has been enshrined in the law, but in private affairs, different voting rights can be found. For example, the election of the board of public companies is based on ownership of common stock.

In terms of structure and governance, online group management solutions have not found satisfactory ways to manage voting privileges for open groups.

Although numerous solutions and inventions have been presented for computerized voting systems and apparatus, very few are applicable to online open groups created in online social networks. Some inventions rely mostly on the physical identification of voters such as finger prints, digital images or signatures (U.S. Pat. No. 5,878,399). Most inventions are proposed transitions from the paper ballot system to a computerized system and are not much concerned with online group dynamics. Voter identification has been a major concern addressed by other inventions. In this invention, voter identification is verified by a username and a password during the login process and the problematic is to determine whether the user is allowed to vote.

One major obstacle with open online groups is that very few reliable means of identification of users are available. Some proposed technologies such as embedded hardware fingerprint recognition would require a policing that would redefine the free flow of information on the internet and are not widely available among internet users. The stigma associated with being fingerprinted or identified by other means of optometric recognition system would also not been perceived well by many internet users. Also such technologies would seem overkill for online social groups where the stakes are not as important as for example the election of the president of the United States or a U.S. senator.

For regular internet users, the standard means of identification are email addresses, internet protocol (IP), sometimes hardware information, user account identifiers and passwords. Email addresses can be created by the hundreds, IP addresses can be disguised easily using various routing schemes. In addition, unlike fixed telephone numbers, IP addresses are often allocated dynamically, further complicating the identification of users.

Regarding user unique identifiers and passwords, the uniqueness of such means of identification doesn't guarantee that each user account corresponds to a real person and not to a fraudster or an impostor.

Therefore, none of standard means of identification seem sufficient to prevent impostors and fraudsters. Thus granting voting rights in an open group without compromising the integrity of the electoral process seems daunting.

In the internet age, most open group solutions have thus ignored the very democratic features of our open societies because the integrity of the electoral process and the fairness of the electoral results could not be guaranteed satisfactorily. Such problematic was absent from closed groups where each and every member wanting to join the group needs prior approval from the group officers before being to join.

U.S. Published Patent Application 2009/0083104 relates to a method for centralized web application interaction which selects local applications for processing web requests. U.S. Pat. No. 7,464,148 describes a gateway which serves as a common entry point for a network utilizing a network information collector (NIC). The prior art does not describe a First-Point Of Entry system for entering profile and other information upon joining a new social network or about updating one's information when the user is concurrently a member of several subscribing social networks.

U.S. Pat. No. 5,878,399 relates to a computerized voting system where voter data that is created at a voting module is compared to stored voter data to determine eligibility. U.S. Pat. No. 6,873,966 describes a secure election system where a ballot view object authenticates the user and permits the casting of ballots which are sealed by encryption. U.S. Pat. No. 7,055,742 relates to an on-line voting system where the voter responds to a challenge before receiving the vote package. U.S. Pat. No. 7,237,717 describes a combined wired and wireless electronic voting system where mobile devices are dynamically reconfigured via a trusted election server. U.S. Pat. No. 7,306,148 relates to an electronic voting system where a ballot generator creates encoded ballots that contain the voter's selections. U.S. Pat. No. 7,451,221 describes a system and method for control and distribution of data files in large-scale distributed networks. The prior art does not describe a system for users to interact democratically within open groups, nor does it suggest a method for managing voting rights in open groups.

SUMMARY OF THE INVENTION

This invention offers a First-Point of Entry (FPOE) method for users wanting to join multiple social networking websites and for users who are members of several subscribing social networks. The system offers modular and seamless cross-websites networking capabilities for internet users who need to enter their profile information (personal and professional data) and their relationship information (networks and individual privileges) only once at the first point of entry without the need for duplicate and repetitive inputs.

It is therefore an object of an embodiment of the present invention to provide a system & method for managing voting rights in open groups in an online social networking environment.

In a first embodiment of the invention, there is provided a system for enabling users in an online social open group to interact democratically and vote. The system includes a server, a database and a set of instructions. The server receives information from the group members and provides information to a requesting user. The database is operatively coupled to said server for storing items of information about the contributing group members. The set of instructions is stored in an electronic storage medium for programming the server to allow the contributing group members to interact democratically in managing the group's affairs and share information within the group.

It is another object according to an embodiment to provide different membership levels and privileges within a group and where membership levels determine whether a user can vote.

It is a further object according to an embodiment to grant users points according to different and various requirements, characteristics and actions so that when a given threshold is attained users can exercise their voting rights.

It is a further object to have the points granted to users expires after a specified period so that voting rights are maintained only when specified requirements, characteristics and/or actions are met over time.

It is a further object where the decisions of group's officer pertaining to membership, expulsion, voting rights are fully logged and made transparent to all other members so as to avoid any bias, favoritism, and/or discrimination.

It is a further system where voting members can elect representatives and officers for the group, approve or reject amendments to the bylaws of the group, approve or reject the group's budget or other financial statements, submit motions on important questions for the group for all voting members to approve or reject, and vote on submitted motions by other voting members or the representatives of the group.

It is a system where voting members can submit motions to the electorate of the group by introducing a question to the group and providing a set of answers from which the electors can chose.

It is a system where voting results can be displayed to voters in real time, in mixed mode (ranking of the outcomes but without displaying a vote count) or at the close of the ballot so as to maintain the secrecy of the election results.

These and other related objects are achieved according to a first embodiment of the invention by a system for managing the sharing of contributed user's information among two or more online social networks which subscribe to the system. The system includes a server, database and a set of instructions for programming the server. The server receives contributed user's information from a first subscribing social network and for selectively provides the contributed user's information to a second requesting subscribing social network. The system database is operatively coupled to said server for storing items of information about the users. The set of instructions is stored in an electronic storage medium for programming the server to upload contributed user's information from a first database associated with said first subscribing social network to said system database. The server further identifies user's common to said first and second subscribing social network, and downloads said contributed user's information from said system database to a second database associated with said second subscribing social network. Upon joining a subscribing social network or updating one's information or initiating new interaction on a subscribing social network, the user's existing information from the first database will be automatically populated to the second database and simultaneously, the user's new information will be automatically populated to all subscribing social networks to which the user has subscribed.

The system database and the set of instructions are maintained on a private computer network which is adapted to interact with a public computer network and a plurality of subscribing social networks. The first database and the second database each include records having fields for membership lists, membership types, member's contributions, social network specific information, sub-group data, member activity and member interaction. The system database includes a users database including one or more of a users profile database, a users connections database and a users privileges database and combinations thereof. The profile, connection and privilege information that a user possesses on the first subscribing social network will be automatically transferred to the second subscribing social network. When the user joins a second subscribing social network, the set of instructions programs the server to download the user's contributed user's information to the second subscribing social network at the users First-Point of Entry (FPOE) in the second subscribing social network. Similarly, when a user updates his/her information or initiates new interactions, the new information automatically flows through seemlessly among the various social networks on the FPOE system avoiding the need for repetitive entries of the same information or loss of content from one network to the other.

According to a second embodiment of the invention, there is provided a system for enabling users to interact democratically and manage voting rights within open groups in a social network environment. The system includes a server, system database and a set of instructions for programming the server. The server hosts an open group associated with a social network. The system database is operatively coupled to the server for storing items of information about the open group and the social network. The set of instructions is stored in an electronic storage medium for programming the server to administer a multilevel test to new users wishing to join the open group or for the existing members. The server further denies the user voting privileges upon failing to pass any level of the test. The server also assigns a voting privilege upon passing all levels of the test. All the open group's new or existing member's voting privilege can be assigned upon determining that the user is real or otherwise qualified, a new member's voting privilege can be denied upon determining that the user is fake or revoked if the user is otherwise not qualified and a member's voting privilege can be revoked if the user fails to maintain his/her necessary qualifications.

The server administers two levels of the multilevel test by calculating total points acquired by the users and determining which points are valid or expired. The users obtain points based on the user's profile and the user's actions. Each point category has a duration period, and points are considered expired and therefore invalid after the duration period expires. The users' are granted one of several voting privileges based on the user's valid point total. Voting privileges may include any one or more of the following exemplary categories: The ability to serve as a candidate for a group office, or vote in group office elections, or vote to amend group by-laws, or initiate group motions.

According to a third embodiment of the invention, there is provide a method for managing the sharing of contributed user's information among two or more online social networks which subscribe to the system. In a first step, a server is provided for receiving contributed user's information from a first subscribing social network and for selectively providing said contributed user's information to a second requesting subscribing social network. Next a system database is operatively coupled to said server for storing items of information about the users. A set of instructions stored in an electronic storage medium is executed for programming the server to upload contributed user's information from a first database associated with the first social network to the system database. The server then identifies user's common to the first and second subscribing social networks, and downloads the user's contributed user's information from said system database to a second database associated with the second subscribing social network. Upon joining a subscribing social network, the user's information from the first database will be automatically populated to the second database.

The FPOE method is a fully modular, dynamic and timely method of sharing information among a plurality of social networks. Updates of shared information among multiple subscribing social networks occur not only at the time when a member joins a new social network in the FPOE system but also at any point in time a member updates information or initiates new interactions. For example, when a member of a social network adds a new contact to his/her networks or update his/her privileges settings or his/her profile information, this new information will automatically be updated among the various social networks within the FPOE system. As an illustration, when member A of social network (i) adds member B to his/her contact list, this new relationship information will also be carried over in social network (j), provided that member B is also a member of social network (j). Similarly if member A of social network (i) updates his/her profile in social network (i), this new information will flow to all the other subscribing social networks to which member A belongs (j), (k) and so on. The dynamic feature of the FPOE method frees users and members of the need of repetitive entries for each social network to which they belong within the FPOE system and prevents the loss of relevant information from one social network to the next. Information updates can occur via the explicit transmission of the new information to the various social networks's specific databases on the system or by the various social networks on the system sharing access to a common central database acting as the repository of common information. In the FPOE method, each social network could be construed as a distinct module in the system, unique and separate from the other modules yet simultaneously part of a bigger whole.

The server, the system database and the set of instructions are maintained on the private computer network which is adapted to interact with a public computer network and a plurality of subscribing social networks. The first database and said second database each include records having various fields, for example, a membership list, membership type, member's contributions, social network specific information, sub-group data, member activity and member interaction. The system database includes a users database including one or more of a users profile database, a users connections database and a users privileges database and combinations thereof. The profile, connection and privilege information that a user possesses on the first subscribing social network will be automatically transferred to the second subscribing social network. Upon the user joining a second subscribing social network, the server downloads the user's contributed user's information to the second subscribing social network at the users First-Point of Entry (FPOE) in the second subscribing social network. Similarly, when a user updates his/her information or initiates new interactions, the new information automatically flows through seemlessly among the various social networks on the FPOE system avoiding the need for repetitive entries of the same information or loss of content from one network to the other.

According to a fourth embodiment of the invention, there is provided a method for enabling users to interact democratically and manage voting rights within open groups in a social network environment. The method includes hosting on a server an open group associated with a social network and operatively coupling a system database to the server for storing items of information about the open group and the social network. A set of instructions stored in an electronic storage medium is executed for programming the server for administering a multilevel test to new users wishing to join the open group. The user is denied voting privileges upon failing to pass any level of the test, and alternatively assigned a voting privilege upon passing all levels of the test. Upon joining a an open group, a new user's voting privilege can be assigned upon determining that the new user is real and a new user's voting privilege can be denied upon determining that the new user is fake or otherwise not qualified. Similarly existing members' voting privilege can be assigned or re-assigned when a member attains the necessary qualifications or alternatively revoked when a user fails to maintain the necessary qualifications.

The administering step includes administering two levels of the multilevel test by calculating total points acquired by the new user and determining which points are valid or expired. A user obtains point based on the user's profile and the user's actions, where each point category has a duration period, and points are considered expired and therefore invalid after the duration period expires. The user's is granted one of several voting privileges based on the user's valid point total. Voting privileges may include one or more of the following exemplary privileges: the ability to serve as a candidate for a group office; the ability to vote in group office elections; the ability to vote to amend group by-laws; the ability to initiate group motions, the ability to approve the group's budgets and access the group's financial information.

BRIEF DESCRIPTION OF THE DRAWINGS

The advantages, nature and various additional features of the invention will appear more fully upon consideration of the illustrative embodiments now to be described in detail in connection with accompanying drawings. In the drawings wherein like reference numerals denote similar components throughout the views:

FIG. 9 is a table showing elector status.

FIG. 10 is a table showing expulsed group member list.

FIG. 22 is a screen shot of a page displaying the financial ledger of a Group.

DETAILED DESCRIPTION OF THE PREFERRED EMBODIMENTS

Group Modularity

Currently there are numerous social networks. Each social network can maintain its own websites and databases such as its user list, its membership types and other site specific information. According to the invention, the members profile information, privilege settings and connection/networking data are stored centrally in a different database either on the same server or in a remote server. Therefore, the invention enables users to join a plurality of groups and subgroups without having to recreate a user profile each time they join a different group. Furthermore, the invention allows the members to automatically transfer their existing connections and privilege policies. Thereafter, the invention enables the members to automatically update their information across multiple subscribing social networks by only inputting their new information one at the FPOE.

Figure 1:
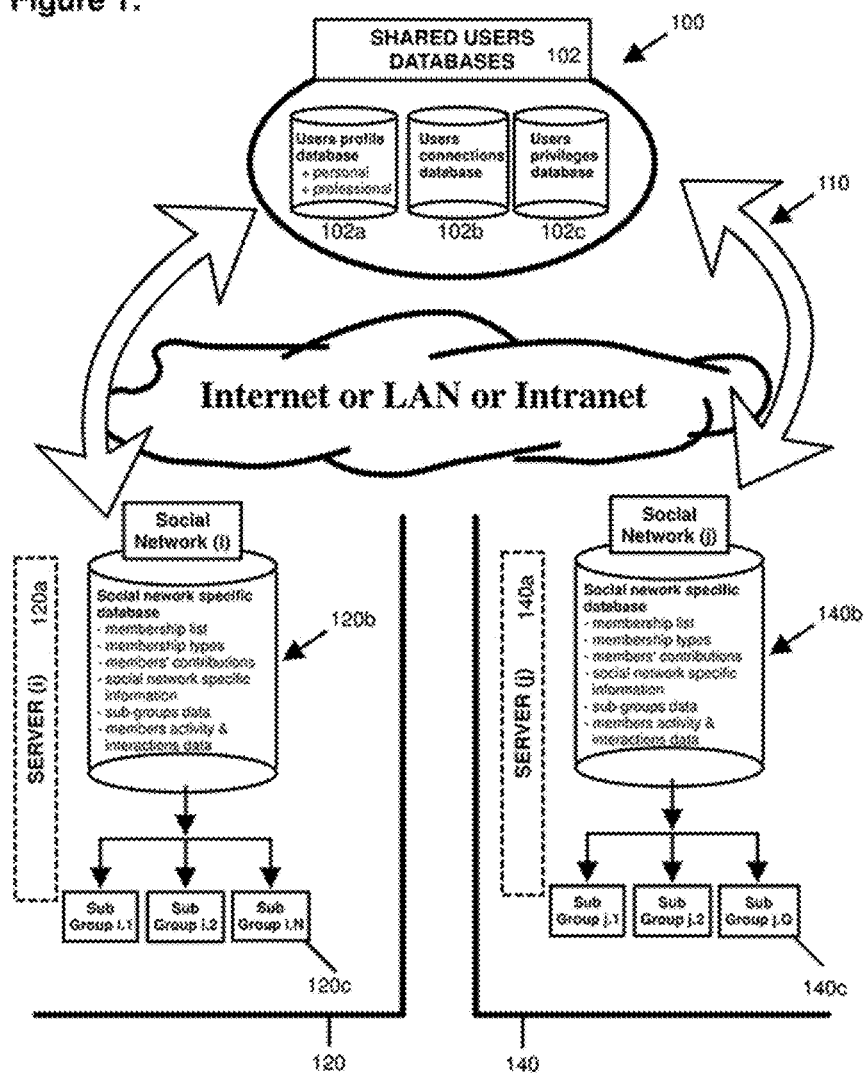
FIG. 1 is a diagram illustrating an embodiment of a First Point of Entry (FPOE) System for Multiple Social Networks according to the invention.

FIG. 1 shows an overview of an embodiment of a First Point of Entry (FPOE) System for Multiple Social Networks. The FPOE System 100 features one or more databases 102a, 102b, 102c that store information on users that are members of Social Networks that are subscribed to the FPOE. For the sake of clarity two Social Networks (i) and (j) are shown. However, it should be noted that the FPOE System according to the invention can be utilized with any number of Social Networks. Social Network (i) is designated generally by reference numeral 120 and includes a Server (i) 120a, Group Specific Databases 120b and Sub-Groups 120c. Social Network (j) is designated generally by reference numeral 140 and includes a Server (j) 140a, Group Specific Databases 140b and Sub-Groups 140c. The FPOE System 100 and its databases 102 are coupled to member Social Networks by internet, LAN, Intranet or other suitable telecommunication means 110.

Figure 2:
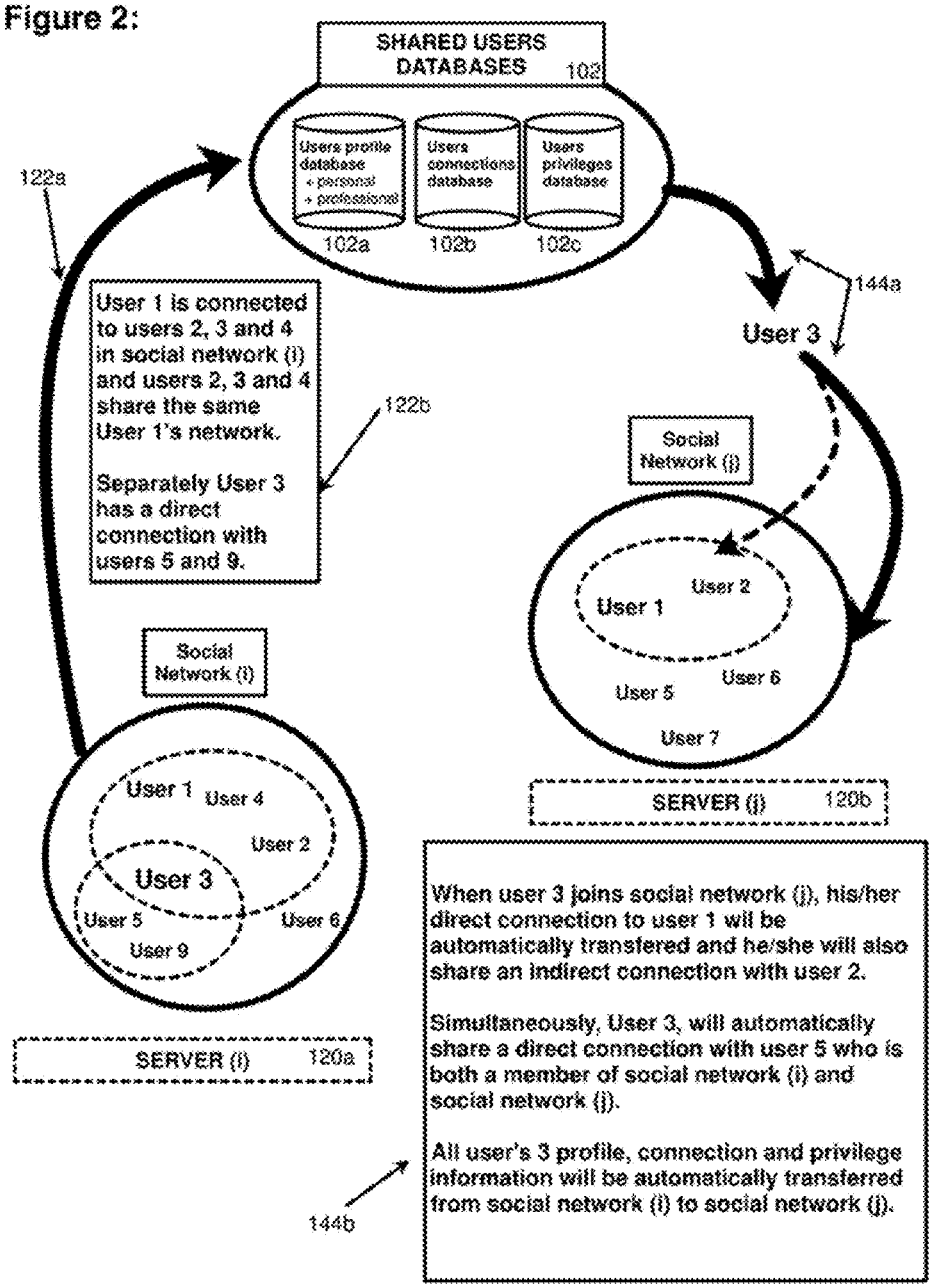
FIG. 2 is a diagram illustrating transmission of group and privilege settings.

When Social Network (i) joins the FPOE System 100, profile information of the users of Social Network (i) is transferred via telecommunications network 110 from Server (i) 120a to the Shared Users Databases 102. Generally the profile information that is communicated consists of data that is common all social networks, for example the user's name, their college, etc. When a user of Social Network (i) joins another Social Network (j) that is part of the FPOE System 100 its shared users database will be centralized in 102a, 102b and 102c. This will allow members of Social Network (j) to automatically join other existing social networks on the FPOE System and to manage their existing membership information on other existing social networks on the FPOE (such as Social Network (i)) without having to re-input their shared data. Every time they join another Social Network on the FPOE System, their shared data will automatically be transferred to the new network they join in conjunction with their relationship data. FIG. 2 further elaborates on this principle. Similarly, every time they update their information or initiate new interactions on an existing Social Network on the FPOE system, this new information will automatically be transferred to the other subscribing social networks to which they belong.

For example, in FIG. 2, when User 3 of Social Network (i) joins Social Network (j), his/her direct connection to user 1—who is also a member of Social Network (j)—is automatically maintained as well as his/her indirect affiliation to user 2—a member of Social Network(j) as well. Simultaneously, the direct connection of user 3 with user 5 from Social Network (i) is also automatically maintained after user 3 joins Social Network (j). More particularly, the connections that are stored in Server (i) 120a are transmitted via telecommunications link 122a according to rules 122b to the Shared Users Databases 102. When the user joins Social Network (j) the connections that are now stored in Shared Users Database 102 are transmitted via telecommunications network 144a to Server (j) 120b according to rules 144b. Thus group and privilege settings will be automatically transferred from the original Social Network to the newly joined Social Network. In the same manner, if a user initiates a new connection on an existing social network within the system, this connection will automatically be transferred to the other subscribing social networks on the FPOE system to which the both the connector and the connectee belong.

This setup allows the group manager to have an integrated environment for their users and to customize the content and structure of their websites to their specific needs without being bound by the requirements of a social network provider.

When rendering a user profile, the invention retrieves the user information from the central database and the privilege policy of the requestee from the requestor and renders or blocks the requested information.

For example, a group could be the members of an association and subgroups could be committee within the association. The group could be the students of a university and the sub-groups could be students clubs formed by the students.

Group Governance

The invention allow for more complex governance structures than has been previously possible for open groups. In particular, the invention allows for the direct election of the group officers by the members, the election or the appointment of a vice president as well as the appointment of supplemental officers by the group officers. Unlike elected officers who cannot be dismissed by the president, appointed officers can be dismissed at will by the president.

In addition, the invention allows the group creator(s) to set the group bylaws and decide how the bylaws can be amended, either directly by the president or should be approved by vote by either the majority of the group's elected officers or by all the voting members.

Furthermore, the invention allows all members to submit motions to the voting members allowing for direct democracy in the group.

Membership Levels

The first step of the invention may require users to be assigned a membership level at the time of their registration. Indeed, in the offline world many groups have different membership levels for their members. For example, the membership level could be based on one's proficiency, one's seniority or on one's relationship with various members of the group. A group for example could establish a junior membership and a senior membership. A professional guild could admit associated members within its ranks from other professions alongside its full members.

In the scope of the present invention, establishing different levels of membership allows to combine some features of a closed group within an open group. In this situation, one type of membership level can be understood as a closed group within the open group and be granted voting rights. Such a feature would resolve the inherent problem of identification within online open groups as the voting members would have to be vetted before being granted the right to vote while maintaining the open membership characteristics of the open group.

For example in one application of this feature, general users can join a group with all the membership privileges but without the right to vote. Only after they have been vetted individually, they can vote.

Figure 3:
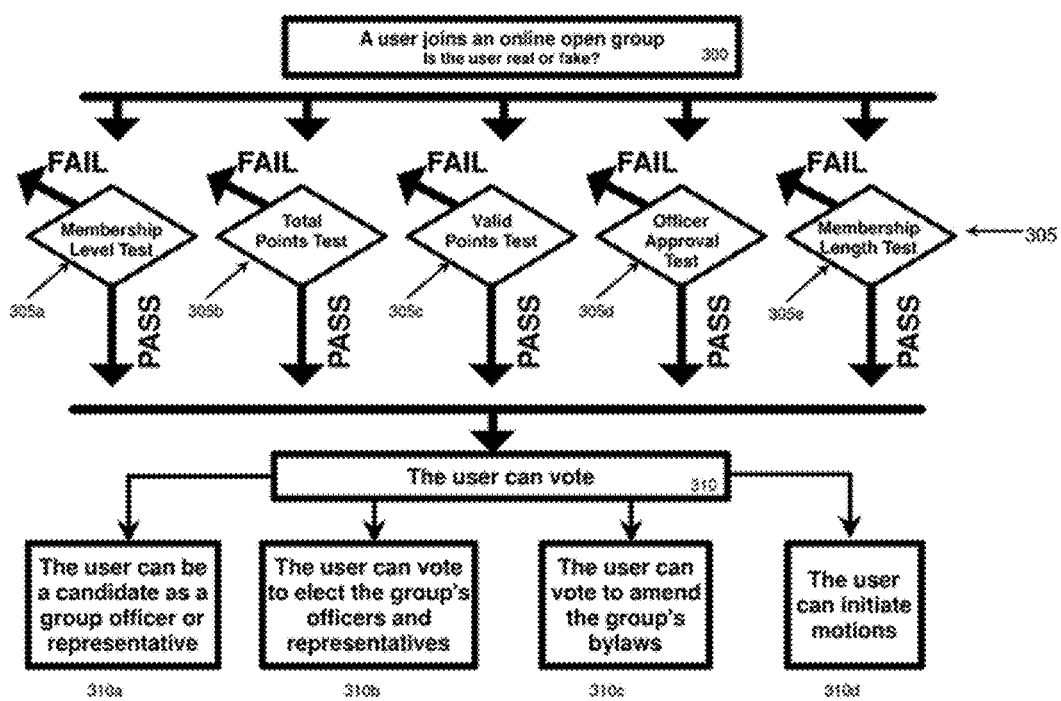
FIG. 3 is a flowchart illustrating an embodiment of a further aspect of the invention relating to a method and system for determination of voting rights.

One method for determining whether a user can vote, and what matter can they vote on is shown in the flowchart of FIG. 3. In this exemplary embodiment, a five step test is employed to determine whether a user can vote in any of four categories. In step 300, a user joins an online open group, and five failsafes indicated generally as 305 are employed to determine whether the users' credentials are real or fake. The diamonds represent decision points where a user can pass or fail at each step. In step 305a a Membership Level Test is employed to determine if the user has the prerequisites necessary to vote in the online open group. This test applies when voting rights are reserved for only certain types of members. Usually a Fail at this stage will prohibit the user from any voting privileges. Next a Total Points Test in step 305b is administered. This test applies when members are required to accumulate points before they can be granted voting rights Since some point can expire over time, a Valid Points Test in 305c is administered to see how many of the total points are still valid. An Officer Approval Test may be provided in step 305d and a Membership Length Test may be provided in step 305e. Depending on the results of the five failsafes 305 and the group rules, the user may be granted voting rights in one or more voting categories 310a, 310b, 310c, and 310d. Some of the failtests described in FIG. 3 also apply continuously to existing members. For example, the Valid Points test is administered continuously to existing members and a member who fails to maintain the minimum valid points required to vote (by letting his/her points expire) will be stripped of his/her voting rights until the member reestablishes the minimum threshold required.

Membership Length

FIG. 3 describes additional conditions required from members before they are granted the right to vote.

One such condition is to require members to have been members for a minimum length of time before they can actually vote. Such a requirement would allow weeding out individuals who may have an incentive to create fake members shortly before the end of an election in order to influence the results in their favor.

Officer Approval

In FIG. 3, another requirement can be set before granting voting privilege to a group member by requiring a group officer to manually grant such privilege. The granting of such privilege can be irrevocable or could be rescinded. In order for the group's officers no to abuse such an authority, the system defaults choice is set to irrevocable.

Figure 4:
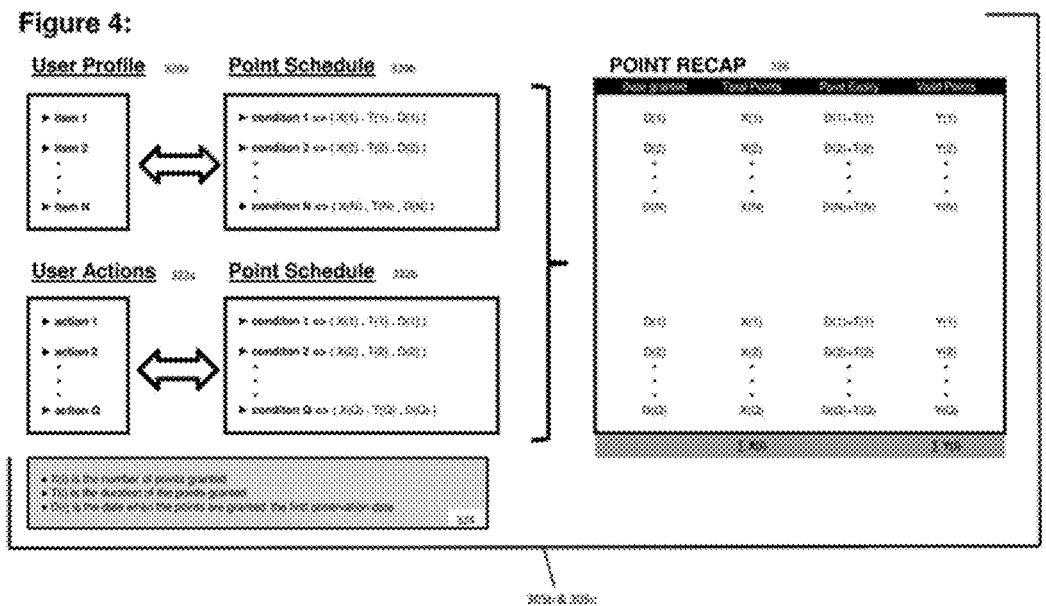
FIG. 4 is a chart showing the point recap from the points tests of FIG. 3.

FIG. 4 is a chart showing an expanded point recap from the Total Points Test 305b and Valid Points Test 305c. The user profile 320a can be used to generate a first point schedule 320b. For example, a user may need a certain educational degree contained in item 1 which will satisfy condition 1. For professional guilds, the guild may require certain qualifications from its members. The user actions 322a can be used to generate a second point schedule 322b. Points needed to satisfy conditions may be calculated based on the legend 324. For example, the user was chairperson of an event held by the group. Points may then be tabulated in the Point Recap Table 326 which has columns for Date Granted, Total Points, Point Expiry and Valid Points. Points may be tracked by factor X(i) representing the number of points granted, Factor T(i) representing the duration of the points granted and Factor D(i) representing the date when the points are granted. The X, T and D factors may be combined to calculate Valid Points Y(i) shown in the last column of the Point Recap Table 326. The sum of the various rows gives a grand total in the bottom right field of the point recap 326 table.

Figure 5:
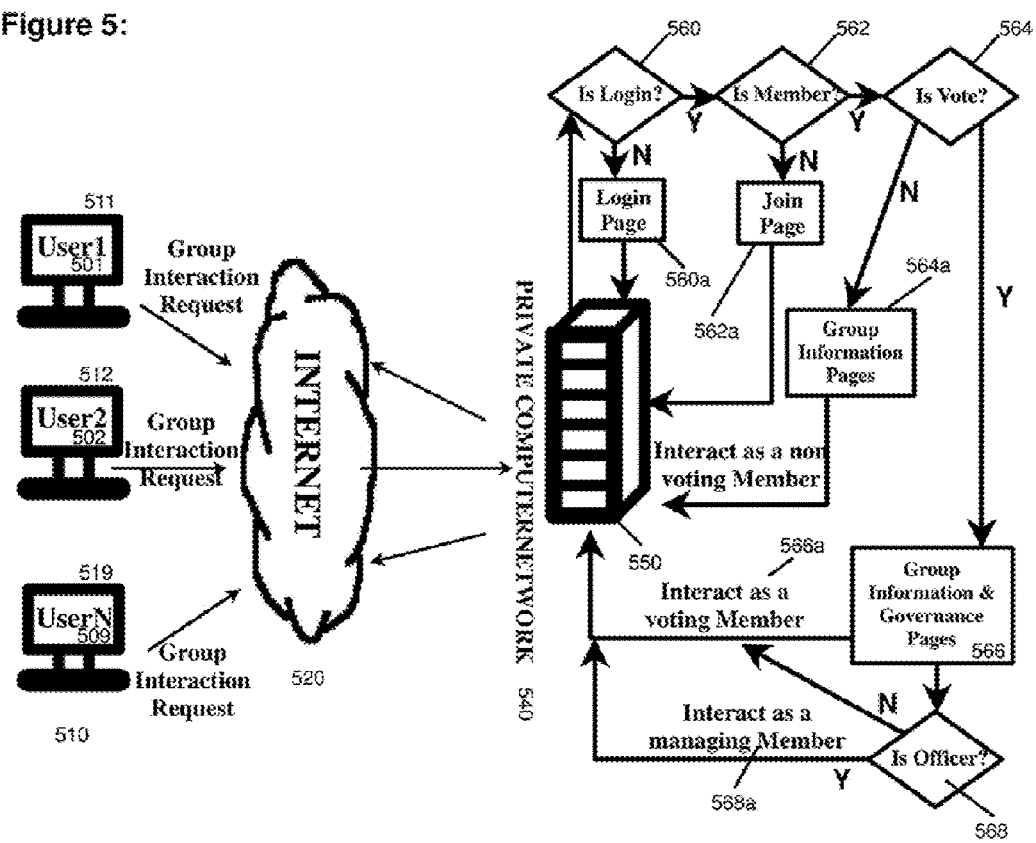
FIG. 5 is a diagram showing a system for member login.

After the voting privileges are determined, various Users 501, 502 and 509 can perform a login process on the system illustrated in the diagram of FIG. 5. Each User has a computing system 511, 512 and 519 respectively.

Computing System

A computing system generally includes a personal computer including a processing unit, a system memory, a hard disk, optional disk drives such as a CD-ROM, DVD-ROM or other optical devices, a system bus that links the various components. The processing unit executes encoded instructions loaded into the system memory from program files stored in the disk drives. One such program is the operating system. In addition to personal computers, user may access the server 550 via the internet 520 on a private computer network 540 with tablets, cellular phones and other wired and wireless internet capable devices.

Other programs include application programs. A computing system also includes input devices such as a keyboard, a microphone, a scanner, a joystick etc. The input devices are generally connected to the processing unit through interfaces. The system also includes output devices such as a display device, speakers, and printers also connected to the system through adapter. When the computing system operates in a network environment, connections must be made to one or more remote computers, servers, routers or other network node. The computing system includes network interfaces or adapters. Such networking devices allow the computing system to connect to intranets, the internet or other computer networks.

Level of Group Interaction

FIG. 5 illustrates how the group level interaction is established. At decision block 560 user needing to login will be directed to the login page 560a. After login the user is directed to member decision block 562. If the user is not a member, they will be directed to Join Page 562a. If they are a member they will be directed to Vote decision block 564. If the user is not qualified to vote they will be directed to Group Information Pates 564a where they can participate or interact as a non-voting member. If the user does have voting privileges they will be directed to Group Information and Governance Pages 566. From this location and the Office Decision Block 568 users will be direct to the options to Interact as a voting member 566a or Interact as a Managing Member 568a.

Membership Levels

Figure 6:
FIG. 6 is an illustration of various levels of membership.

FIG. 6 represents a first example of the different pre-established membership levels within a group. Members have a choice between two membership levels: as Supporter Member or as Active Member. In this case any internet user can join as a Supporter Member. However, to join as an Active Member, an internet user will have to meet certain predefined requirements and characteristics and his/her membership level will need to be validated by a representative of the group. An internet user who doesn't meet the predefined requirement or characteristics will still be admitted in the group but only as a sympathizing member.

Figure 7:
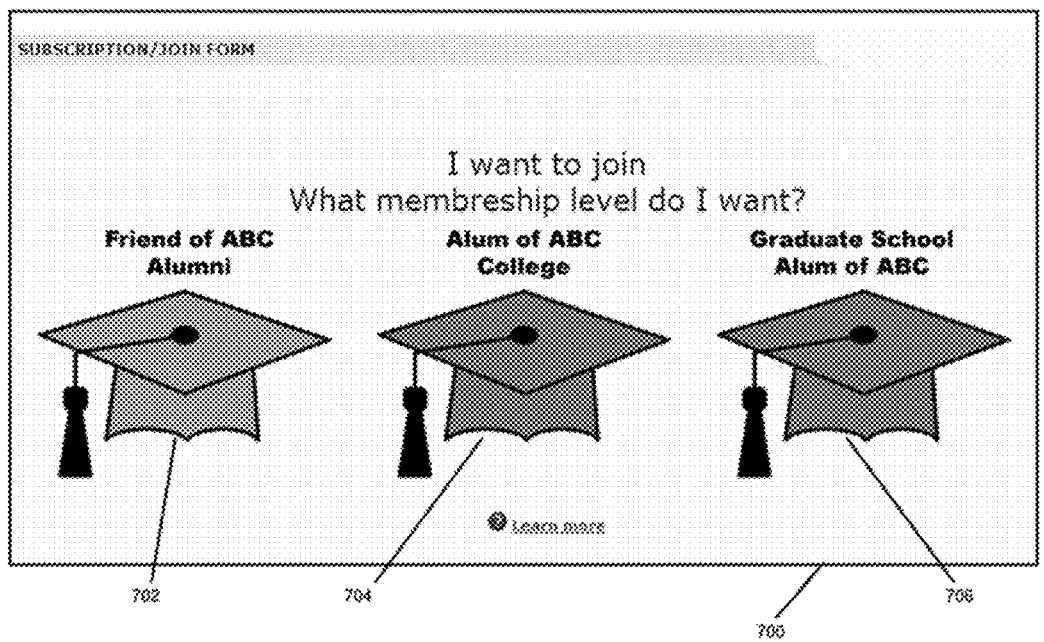
FIG. 7 is an illustration of alternate membership levels.

FIG. 7 represents a second example of the different membership levels within a group. In the case of FIG. 2, members have a choice between three membership level: as Friend of University ABC Alumni, as Alum of University ABC or as Alum of the Graduate School of University ABC. In the case of FIG. 7, the different requirements for the membership levels are easy to identify. General internet users can join the group as Friends of University ABC alumni.

FIGS. 6 and 7 are just two examples of different privilege levels within a group and are not limitative and exclusive of other possible distinctions that are possible for other groups. In reality, many other different membership types could be designed to meet the particular requirements of a group.

As illustrated in FIGS. 6 and 7, providing different membership levels allow a group to remain open but to restrict voting privileges to only one or several membership types but not to others. Step 1, also allows for a potential vetting of some members.

Privileges & Membership Levels

Membership levels in this invention have an implicit ranking and the different membership levels can be coupled with the different member privilege levels described in our previous invention (U.S. patent application Ser. No. 13/079,153). In this situation, when a member joins a group, he/she grants the group members a default group privilege level. When this privilege level granted by the subscriber is higher than the default privilege level attributed by membership types, other members in the group are granted the higher level of privilege. This method of granting a privilege level to a group of people is an efficient way for a member to expand its networks or "spheres of friendship" in a controlled manner. This method was explained in details in paragraph [0017] in our U.S. patent application Ser. No. 13/079,153. The members of the group are granted greater access to the subscriber profile information than they would have otherwise been granted. The entire contents of U.S. patent application Ser. No. 13/079,153 is incorporated herein by reference thereto.

The method incorporates the complexity of human relations by allowing different levels of privileges (or "Friendship Spheres"). The Spheres of Friendship take into account the nature of the relationship and the level of 'intimacy' shared with the other person(s). Sphere of Friendship can be constructed horizontally when a user assigns individual privilege levels to his/her network invitees and/or vertically when a user assigns group privilege levels simultaneously to many members in a shared group.

To enforce the reciprocity of group privileges is crucial to maintaining trust in the privilege system. The group privilege system must prevent some individuals from abusing the group privilege settings. The basic idea behind reciprocity is making sure that when a group member grants a high privilege to other members of a group, such members reciprocate as well. Therefore, reciprocity requires that the other members also grant the granting group members a higher level of privilege before they receive the higher level of privilege the grantor has granted them. If a member does not reciprocate, this member will only receive the lower privilege level he/she has granted to the group members. However, this intuitive logic is insufficient and could easily lead to abuse. An example of abuse is when some members create an empty profile and grant members of the group a high level of privilege in the hope of receiving in turn a higher privilege level. In such instance, reciprocation as described above will break down as the non cheating grantors will have access to a quasi empty profile shell. Therefore the system needs additional build-in falesafes to prevent such abuse. To ensure trust in the system, reciprocity also requires a match on all the falesafes such as membership types, total points and valid points meeting minimum thresholds. The falesafes are very similar to those described previously in FIG. 3 in determining who can vote in the group. In theory, each granting members could specify his/her own falesafes for the reciprocity requirement, but generally, for the sake of simplicity, the method provides default settings that closely match the group voting settings. The problematic of abuse in the group privilege settings and voting share many similarities. The five falesafes described in FIG. 3 are non exhaustive and new falsesafes may be introduced in the system as new patterns of abuse emerge. In addition, the possibility that group members override the group privilege default falesafes is well within the scope of the method described therein. In summary, with the falesafes in place, the other members of a group will be granted the higher privilege settings of the grantor only if they grant an equivalent or higher privilege level and simultaneously meet all the reciprocity falesafe tests. Thus, if the group requires voting member to meet a certain membership type, reciprocity for the group privileges will require that the other members of the group meet this membership type as well. The same logic applies to the other falesafe types.

Voting Restrictions: Membership Length & Points

In some situations however, the procedure described in step 1 is insufficient to differentiate between fake virtual members and actual members as well as between inactive, dormant or otherwise expired members and active members.

In the case of FIG. 6, where the underlying group is a cultural social networking group, active members are determined based on the level of personal information they are willing to share with other members of the group. Such criterion is insufficient to differentiate between an actual individual physical user, a machine or a person faking multiple identities. Again, when voting is involved, not being to establish the one man/woman-one vote principle can be problematic.

Therefore, other steps must be included.

In step 2, the creator of a group can set different voting requirements in addition to the condition set by the membership type.

Voting rights can be granted according to a dynamic voting point system.

After a member has joined, points can be granted when the member meet certain profile conditions. The invention would match the new member's profile with template profiles and when the new member's profile meets certain conditions set in the templates, the new member would receive points for meeting such requirements.

Points can also be granted for a member meeting certain requirements that were not possible to verify at the time of his/her enrollment but became observable after the member became involved in the group. Points can be granted for a member's involvement, attendance, contribution to the group. Points can be also granted for a member receiving recommendations from other voting members of the group.

To avoid any arbitrariness in the granting of points, a clear point schedule should be communicated to prospective members of the group. An objective point schedule should limit arbitrariness and subjectivity.

Points are also a way to have a dynamic and sophisticated vetting system. Points can be used to ensure that only committed and actively participating member can vote. In the invention embodiment, some points are allowed to expire thereby requiring members wishing to vote to constantly meet their point requirements to do so. Such a system filters out fake account created by unscrupulous members in order to influence the results of the group elections and voting.

Figure 8:
FIG. 8 is a table containing a recap of members points.

FIG. 8 is an illustration of how a group member can visualize points he/she has been granted. In this particular figure, points are shown in reverse chronological order (column 1) 802. The second column 804 gives a description of the points received. The third column 806 tells how many points have been received. For example the user has been granted 25 points for having earned a college degree on line 6. The user has been granted a further 50 points for his/her participation at a group meeting and those points are still valid. However, the 100 points the user earned for organizing a group meeting on line 5 have expired. Another characteristic of having points expire is to allow for the removal from the voters roll of members who have dropped out from the group and are no longer actively involved in the group. Inactive accounts can accumulate quickly over time and point expiry ensures that only current active members can vote.

The last column 808 informs the user whether his/her point have expired or at still valid. The last row shows the user how many valid points he/she has received. The system also computes the total number of points received including the points which have expired, although this information is not displayed in this particular table as shown in FIG. 8.

The invention enables the group to sets in its constitution parameters how many total points and how many valid points a user must have earned before being allowed to vote. By having such trigger levels, the group can establish the credentials of a group member before allowing such a member to vote. In the internet age, when a group member may be physically located in a country where no other group members reside and where no physical vetting is possible, having such a point system is crucial before allowing such a member to vote.

Counter-Balance & Transparency

The ability of the group owners to limit the voting rights arising from the legitimate concern of ballot stuffing should be counter-balanced by some mechanism to avoid the same officers abusing their privilege. Therefore one of the invention aspect is to offer everyone full transparency of the officers decisions and actions. One example of such transparency is to make the list of expulsed members public. By making this list public, existing and prospective members can spot potential abuse by current officers. For the same reason, every time a group officer decides to expulse a member from the group, he/she will have to provide an explanation and this explanation will be published for all to see.

Similarly when the by-laws require that members accumulate points to be granted voting rights, the points earned by existing members are made public so that any trace of favoritism, bias or discrimination can be detected and exposed. Further, when the grating of voting rights requires the explicit approval of a group's officer, the list of such members who have been approved and of the members whose approval is pending is rendered public so that all members can verify that such approval is being granted on an objective basis and not subjectively. The basic principle supporting transparency is that by having their decisions and actions scrutinized and exposed, people will refrain from the worst behavior for the fear of being ostracized by other members.

FIG. 9 illustrates how the electoral list is presented to other group members. The Member's Name is shown in column 1 (902), followed by the Date Joined in column 2 (904). The Desired Membership is shown in column 3 (906), followed by the Final Membership status in column 4 (908).

Under the fifth column (910) 'Elector', group members can view who has and who has not been granted voting rights in the group. The group members can further filter this list by only displaying the members who can vote and those who cannot vote, by selecting Group Profile options in the sixth column (912).

Figure 10:
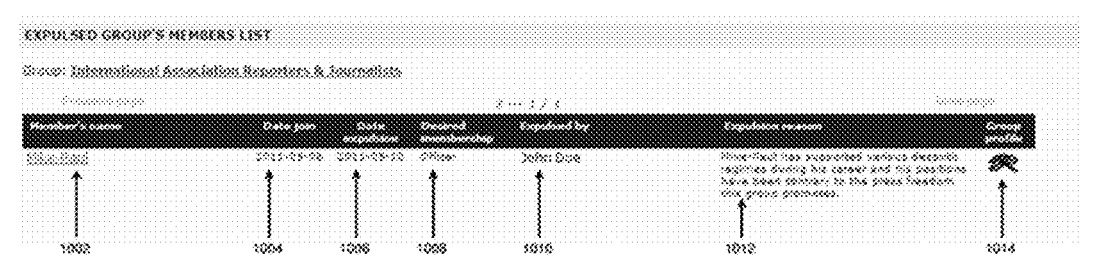

FIG. 10 is an illustration of how group members can access the list of members who have been expulsed, listed in the first column (1001) along with the date they joined in the second column (1004). The table informs all members about the date of the expulsion in the third column 1006, the identity of the expulsor in the fifth column 1010, and the reason given for the expulsion in the sixth column 1012. This table will inform all members about all expulsions taking place in the group and can serve as a deterrent for officers not to abuse their expulsion privilege. Other Group Profile options may be present in the seventh column 1014.

Figure 11:
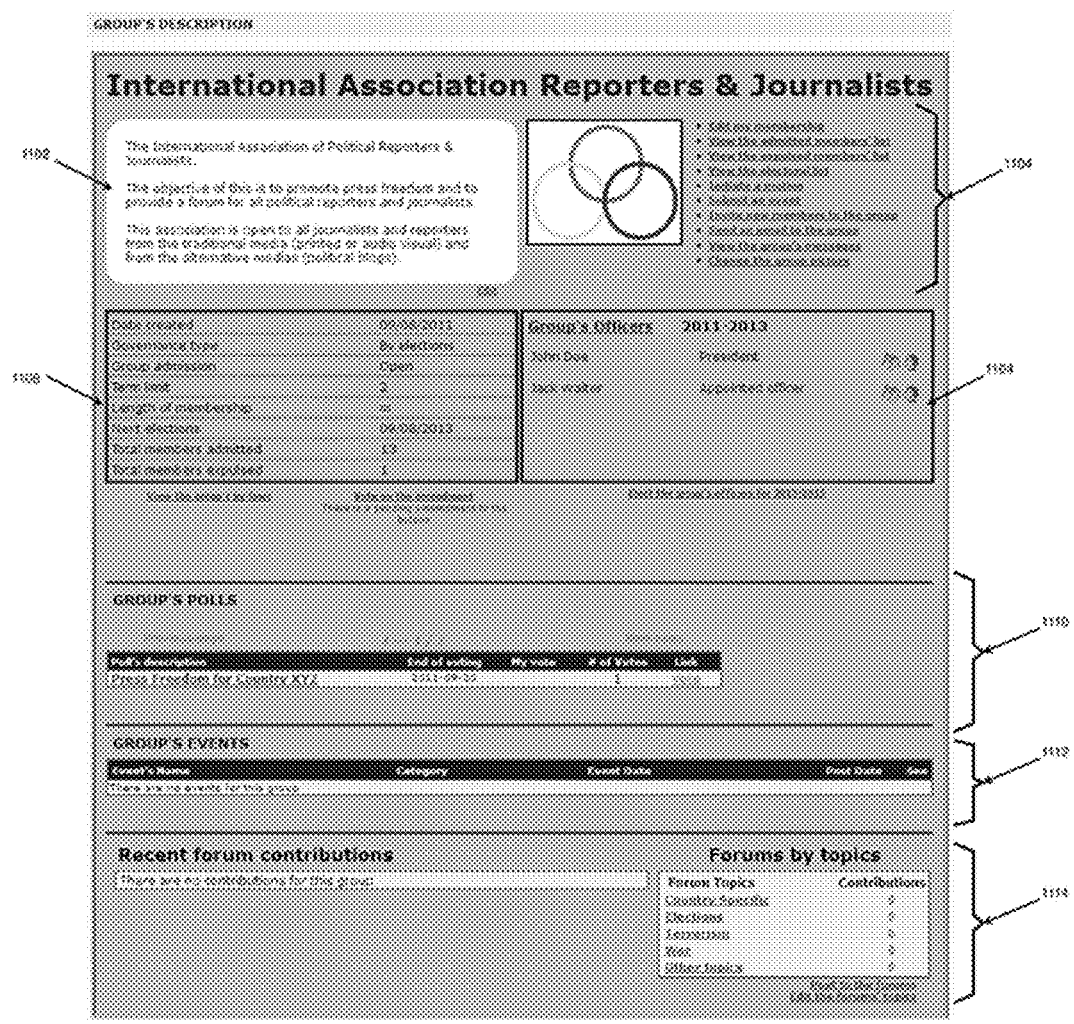
FIG. 11 is a screen shot of a Group's Description page.

Similarly, FIG. 11 which represents the Group's Description page. A description of the group is shown in block 1102. Hot links for navigating to various group pages is shown in section 1104. The number of expulsions is prominently displayed along the total number of admitted members in Table 1106. It is certainly expected that a high number of expulsions will reflect badly on the group and on prospective members. Table 1108 shows the Group's Officers, Section 1110 shows the Group's Polls, Section 1112 shows the Group's Events, and Section 1114 shows Recent Forum Contributions.

Figure 12:
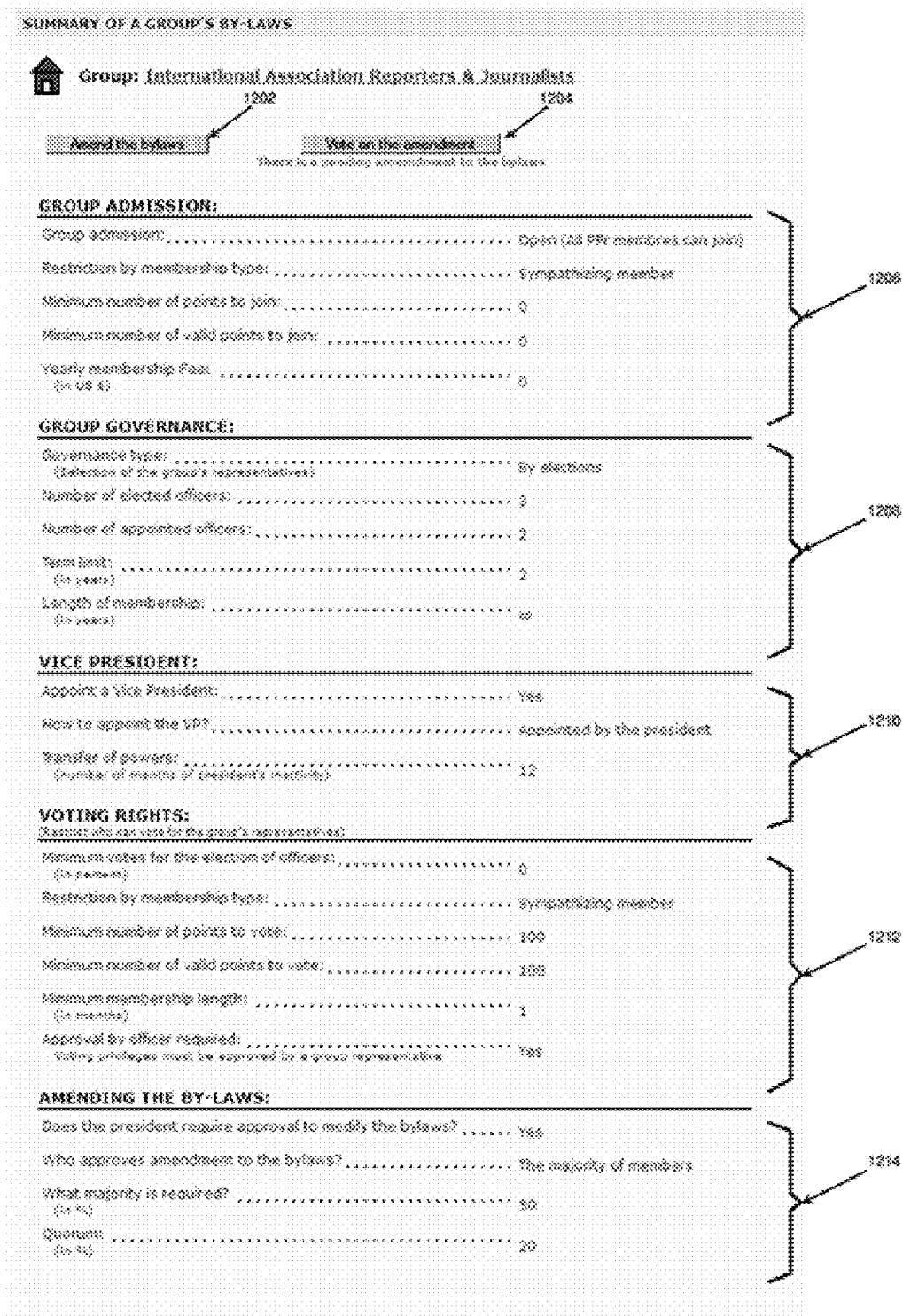
FIG. 12 is a screen shot showing a Summary of a Group's By-Laws.

FIG. 12 is a Summary of a Group's By-Laws The group's president has the option to amend the bylaws 1202 and the members, when required, can approve or reject the proposed amendments by voting via the Vote on the Amendment Link 1204. Group Admission information is shown in Section 1206, Group Governance information is shown in Section 1208, information about the office of the Vice President is shown in Section 1210, Voting Rights information is shown in Section 1212 and information about Amending the By-Laws is shown in Section 1214.

Figure 13:
FIG. 13 is a screen shot of a page used to Join a Group.

FIG. 13 is a screen shot 1302 of an exemplary Join A Group form. The user can select the Type of Membership Desired 1304, the Minimum Privilege granted to other group members 1306 and whether reciprocity from other members is required for the minimum privilege granted to be valid 1308. The choice in 1304 can be to join as a regular member, an officer of the group or as president of the group. If the joining member selects to apply as an officer or as the president of the group and his membership request is granted, he/she will be automatically added to the next ballot for the election of the group representatives. Two fill-in boxes 1310 and 1312 are provided for collecting descriptive information.

Election Group Officers

Figure 14:
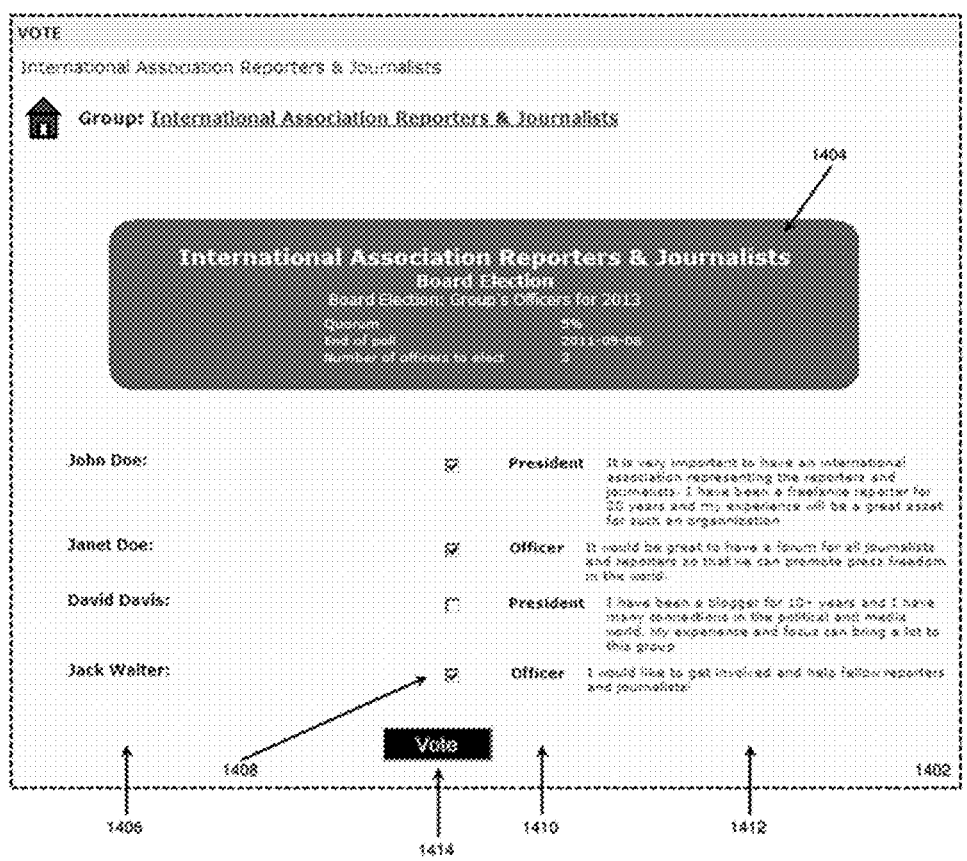
FIG. 14 is a screen shot of a page used to vote for a Group's officers.

FIG. 14 illustrates the election of the group's officers in an exemplary screen shot 1402. The box 1404 is a summary of the election. It lists the number of officers to elect, the quorum required for the elections to be validated and the end date for the election.

Column 1 (1406) lists the name of the candidates, column 3 (1410) the position they are a candidate for, and column 4 (1412) is a short preview of the candidates' electoral pitch. In addition, by clicking on the name of the candidate, voters can access the candidate's profile information for more personal and professional information.

Column 2 (1408) is the column where the elector can vote (hotlink 1414) for the candidates up to the number of officers to be elected (in this particular example up to 3). After voting, the invention display the election results in real time after each vote or at the end of the poll.

Figure 15:
FIG. 15 is a screen shot of a page showing vote tallies.

FIG. 15 illustrates how the voter would see the election results in real time. FIG. 15 shows the number of votes each candidate received in absolute terms as well as in percentages. More particularly, the first column 1504 shows the candidate ranking, the second column 1506 shows a short Description of the candidates being voted on, the third column 1508 shows the Position Desired, the fourth column 1510 shows the number of votes, and the last column 1512 shows the % of votes.

Amending the Bylaws

Figure 16:
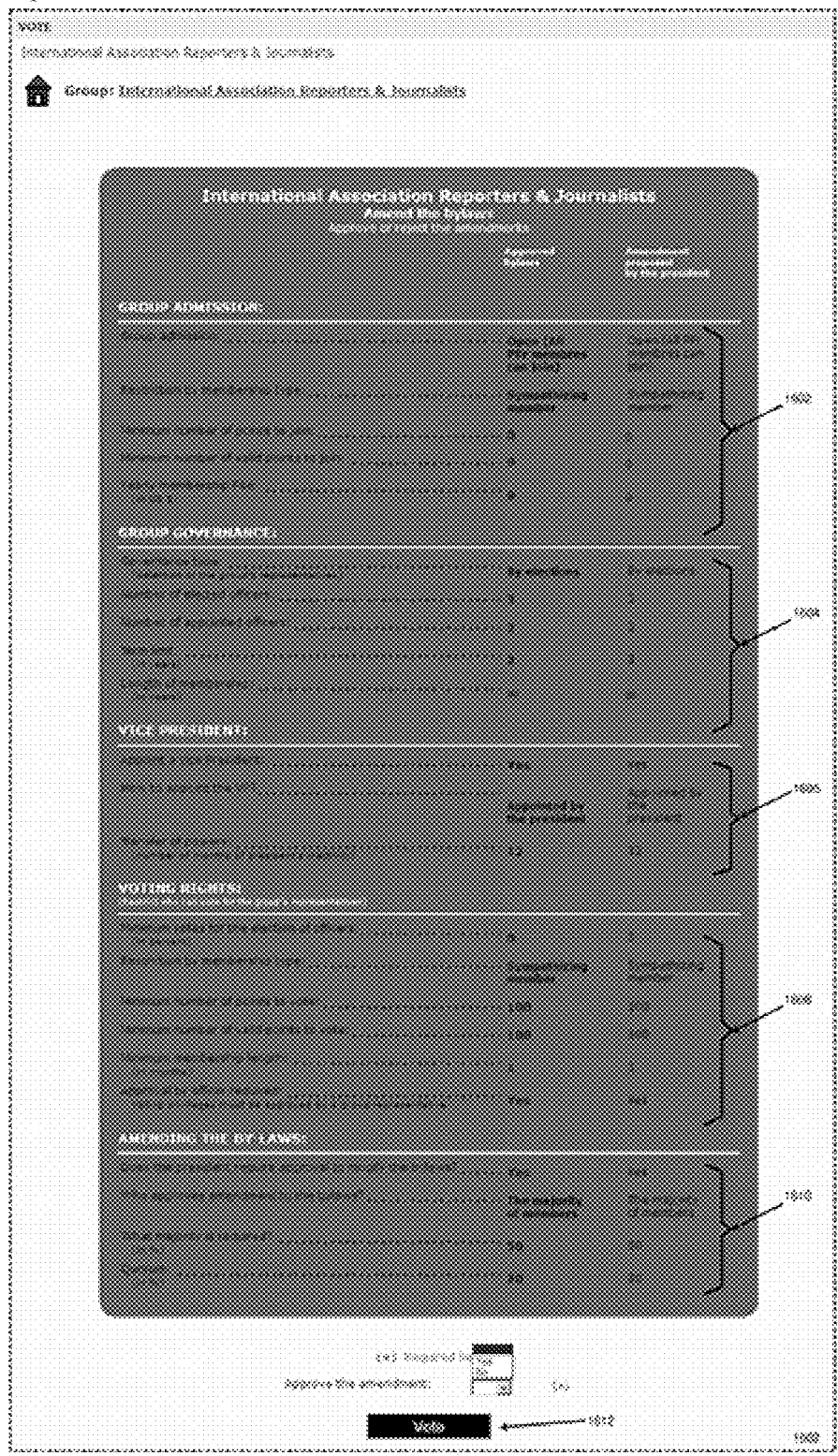
FIG. 16 is a screen shot of a page used to Amend a Group's By-Laws.

FIG. 16 illustrates the vote process for amending the group's bylaws. For democratic open groups where amending the bylaws requires approval, the invention provides two options for approval. The amendment must be approved either by the majority of the elected officers or by the majority of the voting members. Further, the bylaws can require a minimum quorum before the amendment is approved as well as a super-majority to be defined in the bylaws.

In this instance of FIG. 16, three (3) columns are displayed. The first column lists the different articles of the group bylaws and the second column the current bylaws as approved.

The third column lists the proposed amendments. The top row shows the sponsor for the amendment (in this case the president of the group). In this particular instance, only the president can sponsor amendments to the bylaws. In other instances of the invention, elected officers can also propose amendments to the bylaws. In this case, if there is more than one amendment to the bylaws, FIG. 15 would display additional columns for the additional amendments where the top row would specify the different sponsors for the amendments.

The column display allows the voters to easily visualize the proposed amendments against the existing bylaws. Section 1602 shows By-Laws relating to Group Admission, Section 1604 to Group Governance, Section 1606 to Vice President, Section 1608 to Voting Rights and Section 1610 to Amending the By-Laws. In Section 1608, the president is requiring that officers receive a minimum of 5 votes before they can be elected to the Board.

At the bottom of FIG. 16, the voter can approve or reject the amendment. In the case of multiple amendments, the box approve/reject will be situated at the bottom of each amendment column and the voter will be allowed to approve one and only one amendment.

Group Motions

Figure 17:
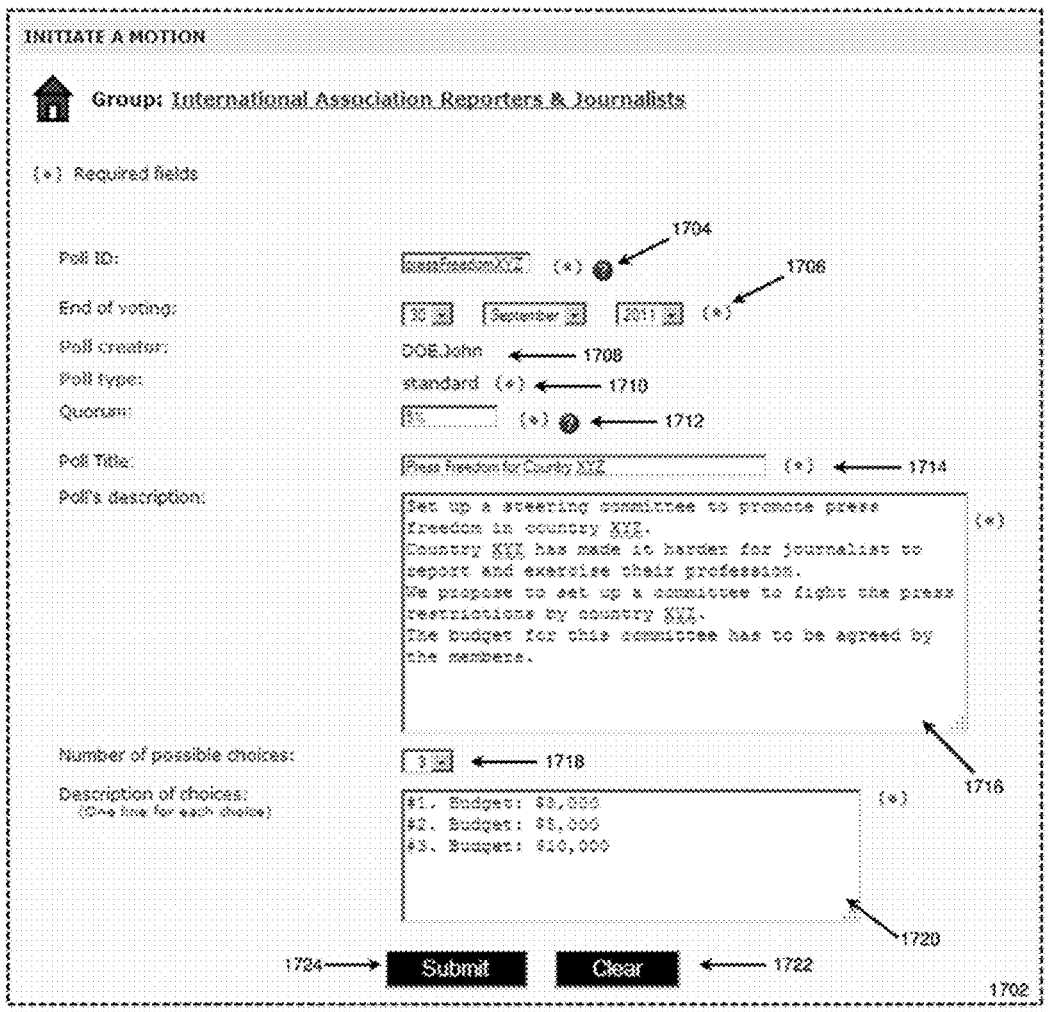
FIG. 17 is a screen shot of a page used to Initiate a Motion.
Figure 18:
FIG. 18 is a screen shot of a page showing a recap of the Motion before submission to the membership.

FIGS. 17 and 18 illustrate how a voting member can initiate a group motion.

In the particular example of FIG. 17 a page 1702 to Initiate a Motion is shown. The motion sponsor must enter a short Poll Id for the poll in Section 1704, and specify when the voting will end Section 1706. Section 1708 indicates the Poll Creator, Section 1710 describes the Poll Type, Section 1712 the Quorum needed and Section 1714 the Poll Title along with the Poll's Description in Section 1716. Section 1720 provides a Description of Choices available under the Motion, and Section 1718 indicates the Number of Possible Choices. In the case of the motion given in this example, the voter will have to decide on the appropriate budget out of a choice of three to be allocated for promoting press freedom in country XYZ. When the Initiate a Motion page 1702 is completed the motion sponsor can clear the entries 1722 or submit the motion 1720.

FIG. 18 shows the motion published on page 1802 for consideration by the membership. The variable input forms of FIG. 17 are now fixed items in FIG. 18 as follows: Poll ID 1804, End of Voting Date 1806, Poll Creator 1808, Poll Type 1808, Quorum 1810, Poll Title 1810, Poll's Description 1814, Number of Possible Choices 1816, and Description of Choices 1816. The Members can then Accept 1818 the Motion as written or opt to Edit the Motion 1820.

Figure 19:
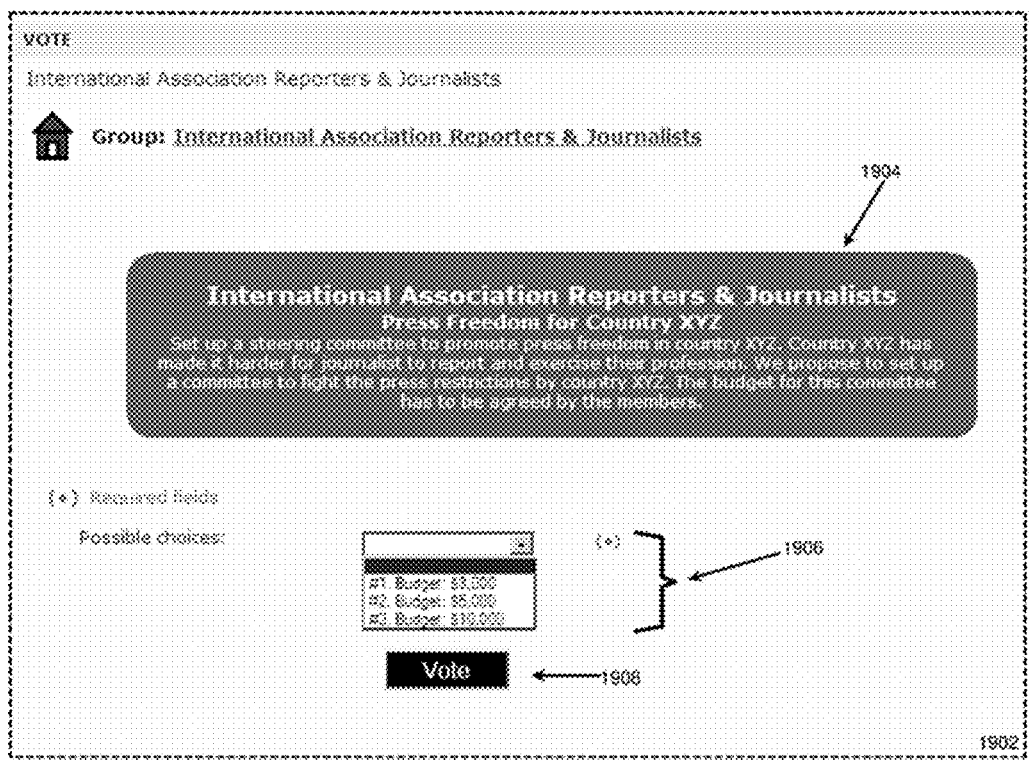
FIG. 19 is a screen shot of a page used to vote on a Motion.

FIG. 19 illustrate a page 1902 presenting the ballot on a motion by a voting member. The motion's question is displayed in box 1904 and the voter must select one of the voting choices in box 1906 then vote 1908.

Figure 20:
FIG. 20 is a screen shot of a page showing vote rankings.

FIG. 20 illustrates a page 2002 of the results of the vote after a voter has casted his/her vote. The results could be rendered in different modes: in real time, in mixed mode or at the end of the poll. In real time, all final ranking, the absolute number of votes and the percentage of the expressed vote are rendered to the voter. In mixed mode, as in the case in FIG. 18, only the ranking of the different choices is rendered to the voter. In end of the poll mode, no voting results are displayed until the voting has closed. Box 2004 shows the vote by real time ranking following the member's vote.

Group Financials

The method also provides for financial transparency and for approval of the financial accounts and budgets by the voting members. For those groups that require a membership fee, financial transparency is particularly relevant. In general, financial transparency and control of the purse is crucial for democratic groups or any democratic system. Transparency fosters management responsibility and accountability. Accurate financial reporting is a basic governance concept for publicly traded companies and it is not an accident that it is regulated by law as management has often resisted such transparency. The method provides the a priori approval of budget (anticipated income and expenses) and an audit trail by making public to all group members the accounting ledgers of the group. Group members can access in real time the transaction ledgers, the income statement and the balance sheet for the group.

The core concept behind financial transparency is to provide access to all voting members of the all group's financial information. In the method, the group's officers input all financial transactions including all revenues and expenses in the group transactional ledgers. The method will generate an income statement and a balance sheet for the group. The group's voting members are provided access to all financial statements including the transaction ledgers. Such detailed transparency allow the group members to monitor and verify when necessary the financial dealings of the group's representatives and spot any irregularities or questionable decisions.

Figure 21:
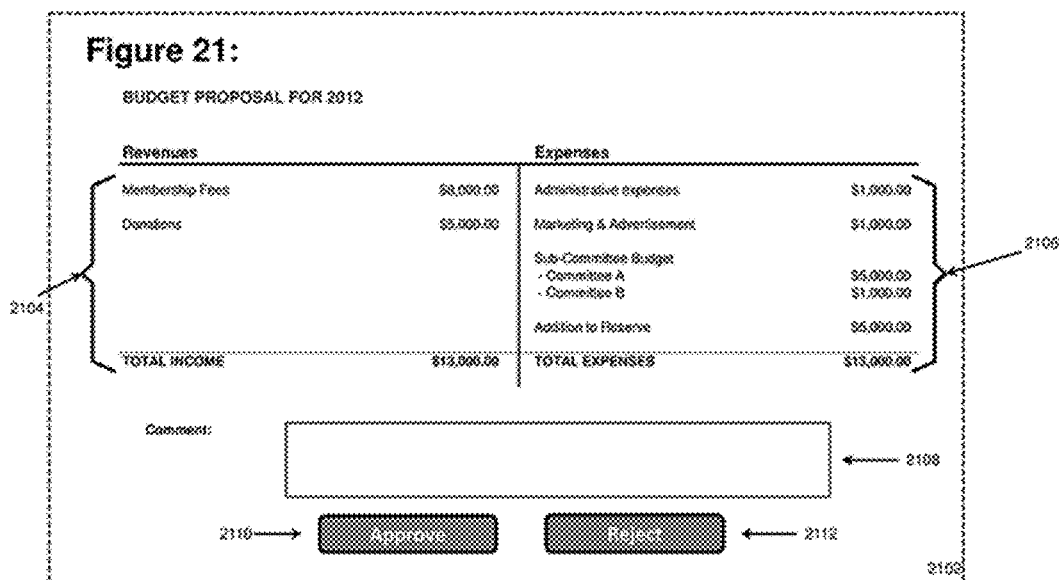
FIG. 21 is a screen shot of a page used to approve on a yearly budget.

FIG. 21 illustrates a page 2102 showing how the voting members can approve (2110) or reject (2112) the group budget proposed by the president. The budget projects forward the anticipated revenues (2104) and expenses (2106). The voting member can post a comment (2108) explaining his/her vote.

FIG. 22 is a Table illustrating how voting members can access the transaction ledger for the groups. The ledger lists all financial transactions by chronological order. A member can further drill down the ledger by filtering the ledger by Transactions (2220), by Accounts (2222), or by Transaction Type (2224). The 3 filters listed here are not exhaustive and the method could provide for additional filters as required. Each transaction in the ledger is identified by a transaction date (2204), a payment date (2206), a transaction code (2208), a transaction description (2210), an account name (2212), a transaction type (2214), a quantity (2216) and a total (2218). Access to such detailed financial information enables the voting members to exercise an effective control over the managers and representatives of the group.

While certain details have been shown and described with respect to hardware, system, and process steps, it should be understood that other options and variations may be incorporated within the spirit of the invention. Various storage devices, computer systems, software applications and telecommunications links may be used. The items of information can be captured by a variety of devices and communicated to the private computer network by all current and future telecommunications means.

The elements shown in the Figures may be implemented in various forms of hardware, software or combinations thereof.

Preferably, these elements are implemented in software on one or more appropriately programmed general-purpose digital computers having a processor and memory and input/output interfaces.

Implementations of the present principles can take the form of an entirely hardware embodiment, an entirely software embodiment or an embodiment including both hardware and software elements. Certain aspects of the present invention involving data processing, sorting, comparing and identification steps are implemented in software, which includes but is not limited to firmware, resident software, microcode, etc.

The present principles may be implemented and can take the form of a computer program product accessible from a computer-usable or computer-readable medium providing program code for use by or in connection with a computer or any instruction execution system. For the purposes of this description, a computer-usable or computer readable medium can be any apparatus that may include, store, communicate, propagate, or transport the program for use by or in connection with the instruction execution system, apparatus, or device. The medium can be an electronic, magnetic, optical, or semiconductor system (or apparatus or device). Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk—read only memory (CD-ROM), compact disk—read/write (CD-R/W) and DVD.

A data processing system suitable for storing and/or executing program code may include at least one processor coupled directly or indirectly to a server and memory elements through a system bus. The memory elements can include local memory employed during actual execution of the program code, bulk storage, and cache memories which provide temporary storage of at least some program code to reduce the number of times code is retrieved from bulk storage during execution. Input/output or I/O devices (including but not limited to keyboards, displays, pointing devices, etc.) may be coupled to the system either directly or through intervening I/O controllers.

Network adapters may also be coupled to the system to enable the data processing system to become coupled to other data processing systems or remote printers, servers or storage devices through intervening private or public networks. Modems, cable modem and Ethernet cards are just a few of the currently available types of network adapters.

Having described preferred embodiments for processes, apparatus and systems used therein for managing the sharing of contributed information in online social networks and managing voting rights within open groups (which are intended to be illustrative and not limiting), it is noted that modifications and variations can be made by persons skilled in the art in light of the above teachings. It is therefore to be understood that changes may be made in the particular embodiments of the invention disclosed which are within the scope and spirit of the invention as outlined by the appended claims. Having thus described the invention with the details and particularity required by the patent laws, what is claimed and desired protected by Letters Patent is set forth in the appended claims.

What is claimed is:

1. A computer system for facilitating sharing, over a communications network, of a user's social network account data among a plurality of social networks, comprising:

a database storage device for storing a first user's social network account data comprising profile data, relationship data and privilege data, wherein profile data comprises at least the first user's name and location, relationship data comprises connections with others representing social relationships, and privilege data comprises a list of permissions and dynamic rules, wherein each permission defines whether the first user may view an individual piece of data in an account of another user;

a server communicatively connected to the database storage device, the server including a memory device, a network interface device communicatively coupled with the communications network, and a processor configured for:

reading, over the communications network, the first user's social network account data from a first social network, and storing the social network account data in the database storage device;

accessing, over the communications network, a second social network;

identifying users in the second social network to which the first user has a connection in the first social network;

transmitting, via the communications network, to the second social network: a) the profile data of the first user, b) only the relationship data of the first user that pertains to the users that were identified above, and c) only the privilege data of the first user that pertains to the users that were identified above;

monitoring, via the communications network, the first user's social network account data on the first social network and, upon detecting any update of the first user's social network account data on the first social network, uploading, via the communications network, said update of the first user's social network account data to the second social network;

establishing a connection representing a social relationship between the first user and a second user, wherein the relationship data in the first user's social network account data reflects the connection with the second user and wherein privilege data in the first and second user's social network account data reflects that the first user has the same permissions to view data of the second user as the second user has to view data of the first user; and establishing another connection representing a social relationship between the first user and a third user via the second user, wherein the relationship data in the first user's social network account data reflects the connection with the third user and wherein privilege data in the third user's social network account data reflects that the third user has the same permissions to view data of the first user as the second user has to view data of the first user.

2. The computer system of claim 1, wherein the profile data further comprises at least one of: an identification of a group of which the first user is a member, an identification of a membership level of the first user in said group and an identification of the voting rights of first user in said group, and wherein the identification of voting rights is stored in a group specific database.

3. The computer system of claim 2, wherein the relationship data further comprises a type of connection with others.

4. The computer system of claim 3, wherein each permission in the list of permissions in the privilege data further defines how a user may interact with an individual piece of data in an account of another user, and wherein the privilege data includes dynamic rules.

5. A computer system of claim 1, wherein the processor is further configured for:

- storing in the database storage device, a group definition including a description of the social network group, a list of user members and a list of voting privileges assigned to each user member of the group;
- receiving, over the communications network, a request from a new user wishing to join the group;
- providing, over the communications network, a dynamic multilevel test to the new user, so as to identify and eliminate fake accounts or impostors;
- reading the new user's contributions to the group via the communications network, and awarding points to the new user accordingly, wherein the points expire after a defined period of time, thereby requiring the new user to continue to contribute to the group;
- providing, over the communications network, a forum for allowing other users to vote on privileges for the new user;
- evaluating: a) results of the multilevel test taken by the new user, b) the new user's contributions to the group, c) and votes provided by other users on privileges for the new user, so as to identify and eliminate fake accounts or impostors;
- assigning one or more of a plurality of voting privileges to the new user based on the evaluating step above; and
- providing, over the communications network, a forum for allowing members of a group to elects officers or representatives, for allowing group motions to be submitted and voted upon by members of the group, for amending bylaws of the group by vote of the group members and for approving a budget for the group by vote of the group members.

6. A computer system for providing access to a social network group over a communications network, comprising:

- a database storage device for storing a group definition including a description of the social network group, a list of user members and a list of voting privileges assigned to each user member of the group;
- a server communicatively connected to the database storage device, the server including a memory device, a network interface device communicatively coupled with the communications network, and a processor configured for:
- receiving, over the communications network, a request from a new user wishing to join the group;
- providing, over the communications network, a dynamic multilevel test to the new user, so as to identify and eliminate fake accounts or impostors;
- reading the new user's contributions to the group via the communications network, and awarding points to the new user accordingly, wherein the points expire after a defined period of time, thereby requiring the new user to continue to contribute to the group;
- providing, over the communications network, a forum for allowing other users to vote on privileges for the new user;
- evaluating: a) results of the multilevel test taken by the new user, b) the new user's contributions to the group, c) and votes provided by other users on privileges for the new user, so as to identify and eliminate fake accounts or impostors;
- assigning one or more of a plurality of voting privileges to the new user based on the evaluating step above;
- providing, over the communications network, another forum for allowing members of a group to elects officers or representatives, for allowing group motions to be submitted and voted upon by members of the group, for amending bylaws of the group by vote of the group members and for approving a budget for the group by vote of the group members;
- storing a first user's social network account data comprising profile data, relationship data and privilege data, wherein profile data comprises at least the first user's name and location, relationship data comprises connections with others representing social relationships, and privilege data comprises a list of permissions and dynamic rules, wherein each permission defines whether the first user may view an individual piece of data in an account of another user;
- reading, over the communications network, the first user's social network account data from a first social network, and storing the social network account data in the database storage device;
- accessing, over the communications network, a second social network;
- identifying users in the second social network to which the first user has a connection in the first social network;
- transmitting, via the communications network, to the second social network: a) the profile data of the first user, b) only the relationship data of the first user that pertains to the users that were identified above, and c) only the privilege data of the first user that pertains to the users that were identified above;
- monitoring, via the communications network, the first user's social network account data on the first social network and, upon detecting any update of the first user's social network account data on the first social network, uploading, via the communications network, said update of the first user's social network account data to the second social network;
- establishing a connection representing a social relationship between the first user and a second user, wherein the relationship data in the first user's social network account data reflects the connection with the second user and wherein privilege data in the first and second user's social network account data reflects that the first user has the same permissions to view data of the second user as the second user has to view data of the first user; and
- establishing another connection representing a social relationship between the first user and a third user via the second user, wherein the relationship data in the first user's social network account data reflects the connection with the third user and wherein privilege data in the third user's social network account data reflects that the third user has the same permissions to view data of the first user as the second user has to view data of the first user.

7. The computer system of claim 6, wherein the profile data further comprises at least one of: an identification of a group of which the first user is a member, an identification of a membership level of the first user in said group and an identification of the voting rights of first user in said group.

8. The computer system of claim 7, wherein the relationship data further comprises a type of connection with others.

9. The computer system of claim 8, wherein each permission in the list of permissions in the privilege data further defines how a user may interact with an individual piece of data in an account of another user.

* * * * *